3,477,999
METHOD FOR POLYMERIZATION OF VINYL COMPOUNDS
Saburo Takeda, 29–24 Mitsuzawashimocho, Hiromi Higashi, and Ryokichi Tarao, 44 Otsutomocho, Mikio Mizuno and Kazuyuki Watabe, 303 Termaecho, all of Kanazawa-ku Yokohamashi, Kanagawa-ken, Japan, Michiaki Saito, 1938 Ookacho, Minami-ku, Yokohamashi, Kanagawa-ken, Japan, Shigeo Namikawa, 44 Otsutomocho, Kanazawa-ku, Yokohama-shi, Kanagawa-ken, Japan, and Takao Tsunoda, 28–15, 3-chome, Sataemachi, Tsurumi-ku, Yokohama-shi, Kanagawa-ken, Japan
No Drawing. Filed Apr. 11, 1967, Ser. No. 629,916
Claims priority, application Japan, Apr. 11, 1966, 41/22,794; Sept. 30, 1966, 41/64,536; Oct. 13, 1966, 41/67,080; Oct. 22, 1966, 41/69,624; Dec. 29, 1966, 42/323; Jan. 10, 1967, 42/1,908
Int. Cl. C08g *1/56;* B01j *11/84*
U.S. Cl. 260—78.5                                    12 Claims

ABSTRACT OF THE DISCLOSURE

A method for polymerizing or copolymerizing vinyl chloride or vinylidene chloride which comprises polymerizing or copolymerizing said compound by the use of a modified Ziegler type catalyst consisting of a transition metal compound, an organoaluminum compound and a lower aliphatic alcohol possessing, as a substituent, an amino radical, nitrile radical or a halogen atom, the catalyst preferably consisting of a transition metal compound and an isolated reaction product between an organoaluminum compound and a lower alkanolamine.

---

This invention relates to a method for polymerizing vinyl compound. More particularly it relates to a method for polymerizing vinyl chloride or vinylidene chloride or copolymerizing vinyl chloride or/and vinylidene chloride in the presence of a modified Ziegler type catalyst.

It has been known that the polymerization of vinyl chloride or vinylidene chloride with a Ziegler type catalyst yields a colored polymer due to the dehydrochlorination of the formed polymer. In order to overcome such a drawback, the use of various modified Ziegler type catalysts have been studied. With regard to such studies, collective reports are found in "Vinyls and Polymers" (Japan), vol. 5, No. 6, pp. 24–27 (1965) for vinyl chloride and "A" collection of lecture gists of the 14th discussion assembly on high molecular compounds" (Japan), pp. 281–286 (1965) for vinylidene chloride. However it can hardly say that anyone of the processes reported therein enables to overcome the above-mentioned drawback satisfactorily.

Accordingly, it is an object of the present invention to provide a method for producing a non-colored polymer or copolymer of vinyl chloride or vinylidene chloride which does not accompany the dehydrochlorination. It is another object of the present invention to provide a method for producing the above-mentioned polymer or copolymer having a higher molecular weight by using a catalyst possessing a sufficiently high activity even at a relatively low temperature which can be handled safely and affords a high polymerization rate. It is a further object of the present invention to provide a method for producing a powdery polymer which is rich in syndiotacticity and does not contain tetrahydrofuran-insoluble part or other impurities. It is still a further object of the present invention to provide a method for producing a polymer which affords a film superior in transparency. It is still a further object of the present invention to provide a method which can be applied to the copolymerization of vinyl chloride or/and vinylidene chloride with a wide variety of polymerizable unsaturated compounds while affording a homogeneous copolymer containing hardly a homopolymer.

These objects and other advantages can be attained by the method of the present invention.

According to the method of the present invention, a lower aliphatic alcohol containing an amino radical, nitrile radical and a halogen atom as a substituent, is used as a modifier of Ziegler type catalyst. In other words the present invention consists in a method for polymerizing or copolymerizing a vinyl compound represented by a general formula of

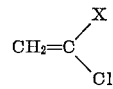

wherein X is H or Cl atom, which comprises polymerizing or copolymerizing said compound by the use of a modified Ziegler type catalyst consisting of (a) a compound of transition metal, (b) an organialuminum compound and (c) a lower aliphatic alcohol possessing the above-mentioned substituent.

The compound of transition metal, which is a constituent of the catalyst, includes halide, oxyhalide, alkoxide, alkoxyhalide, alkoxyacetylacetonate, acetoxyhalide or acetylacetonate of titanium, vanadium, chromium, iron, cobalt, nickel, zirconium or manganese.

Representative compounds are $Ticl_4$, $Ticl_3$, $Ticl_2$, $TiBr_4$, $TrBr_3$, $TiI_4$, $TiI_3$, $Ti(OC_4H_9)_4$, $Ti(OC_4H_9)_3Cl$, $Ti(OC_4H_9)_2cl_2$, $Ti(OC_3H_7)_2(acac)_2$ $TiO(acac)_2$, $Ti(ococH_3)_2cl_2$, $VOCl_3$, $Vcl_4$, $Vcl_3$, $Crcl_3$, $CrO_2cl_2$, $Cr(acac)_3$, $Cocl_2$, $Co(acac)_2$, $Co(acac)_3$, $Fe(acac)_2$, $Fe(acac)_3$, $Ni(acac)_2$, $Zrcl_4$, $Zrcl_3$, $Zr(acac)_4$. acac is the abbreviation of acetylacetonate radical. The material such as $Ticl_3 \cdot \frac{1}{3} Alcl_3$ also is included.

Illustrative oragnoaluminum compound includes compounds expressed by a general formula, $AlRmX_{3-m}$, wherein R is alkyl, cycloalkyl or aryl radical, X is halogen and m is 3, 2, 1.5 or 1 such as trimethyl aluminum, triethyl aluminum, tricyclohexyl aluminum, triphenyl aluminum diethyl aluminum chloride, ethyl aluminum sesquichloride or ethyl aluminum dichloride.

The lower alcohol to be used in the present invention as a modifier contains halogen atom, nitrile radical or amino radical. Exemplary lower alcohols containing halogen or nitrile are ethylene chlorohydrine, ethylene bromohydrine and ethylene cyanohydrine.

The lower alcohols containing amino radical are alkanolamine possessing N-substituted or non-substituted amino radical. As N-substituted radical, N-alkyl, N-cycloalkyl, N-aryl radical are useful and one or two substitutions are possible.

As alkanolamines possessing N-substituted amino radical, monoethanol amines possessing, as N-substituent, one or two radicals such as N-methyl, N, N-dimethyl, N-ethyl, N, N-diethyl, N-butyl, N, N-dibutyl, N-cyclohexyl, N, N-dicyclohexyl, N-phenyl, N, N-diphenyl or the like are illustrated.

As alkanolamine possessing non-substituted amino radical, mono-ethanol amine (MEA), n-propanol amine (nPA), isopropanol amine (iPA), diethanolamine (DEA), triethanolamine (TEA) or the like are illustrated.

Hydrochloric acid salts, and sulfuric acid salts of the above-mentioned alkanol amines are also useful.

In the polymerization, the above-mentioned three components (a), (b) and (c) can be added to the polymerization system as a mixed catalyst. It is also possible to react an organoaluminum compound with a substituted lower alcohol in advance and to use the isolated reaction product together with a compound of a transition metal, as a catalysts. In order to attain the object of the present invention, the latter process is preferable. Such reaction products of organoaluminum compound with a substituted lower alcohol include reaction products consisting of $AlMe_3$-MEA (mol ratio 1:1), $AlEt_3$-MEA (1:1), $AlEt_3$-nPA (1:1), $AlEt_3$-iPA (1:1), $AlEt_3$-MEA (1:2), $AlEt_3$-DEA (1:1), $AlEt_3$-DEA (2:1), $AlEt_3$-(N-MeMEA) (1:1), $AlEt_3$-(N, N-Me$_2$MEA) (1:1), $AlEt_3$-(N-EtMEA) (1:1), $AlEt_3$-(N, N-Et$_2$MEA) (1:1), $AlEt_3$-(N-PhMEA) (1:1), $AlEt_3$-(N, N-Ph$_2$MEA) (1:1), $AlEt_3$-(N-cyclohexyl MEA) (1:1), $AlEt_3$-(N, N-(cyclohexyl)$_2$ MEA) (1:1).

With regard to the mol ratio of these catalyst constituents, explanation is given in the case where an alkanol amine is selected as a (c)-constituent.

First of all, the organoaluminum compound is used generally in a mol ratio of one or more relative to a compound of a transition metal. When an organoaluminum compound is used in the form of isolated reaction product with an alkanol amine, the mol ratio of said reaction product relative to a compound of a transition metal is in the range of one or more, preferably in the neighbourhood of one to three (Organoaluminum compounds generally exist as a dimer but the mol ratio is calculated as monomer throughout the specification and claims). It is also possible to add free organoaluminum compound to the above-mentioned reaction product with an alkanol amine. In such a case the activity of the resultant catalyst increases further. However even in a mol ratio less than one, the catalysts possesses activity. For example when a reaction product of $AlEt_3$-MEA (1:1) is used together with $TiCl_4$, the catalyst having a zero mol ratio of Al-compound to Ti-compound, hardly shows activity but with the increase of the ratio to 0.5, 1, 2, . . . in this order, the activity gradually increases and reaches a maximum value in the neighbourhood of 3 to 5. With the mol ratio greater than this value, the catalytic activity does not increase but gradually decreases. Since the reaction product of $AlEt_3$-MEA possesses, by itself, a certain extent of catalytic activity, the activity does not drop to zero even in a considerably increased mol ratio.

The mol ratio of organoaluminum compound to alkanolamine is selected in the range where one is a central value. In the mixed catalyst system where the above-mentioned two constituents are used with a compound of transition metal in the mixed form of the three, the mol ratio of triethyl aluminum, diethyl aluminummonochloride or the like to alkanol amine is generally in the range of 1–4. Whereas when a reaction product of the two constituents is used, the organoaluminum compound is used even in the mol ratio less than one as in the case of the reaction product of $AlEt_3$-MEA (1:2).

Since the catalysts system loses its actvity in the presence of water or oxygen, the reaction must be carried out generally in the atmosphere of nitrogen. Though the reaction product of organoaluminum compound and alkanol amine decompose when exposed to the air, but it does not ignite. Compared with trialkyl aluminum which has a great ignition property, it affords an advantage that it forms a stabilized catalyst system which can be handled safely.

The polymerization can be carried out even at a temperature generally used in the polymerization with a common radical polymerization catalysts. However since the catalytic system of the present invention is considerably stable to heat, it exhibits a sufficient catalyst activity even at a temperature of 80° C. or more. The reaction is carried out generally at −20° C. to 100° C., preferably at 30°–70° C.

The reaction system shows grey, pale yellow or bright violet color and does not show black color as in the case of Ziegler type catalyst merely modified with a common alcohol. When the catalyst activity is compared by using the polymerization velocity as a barometer, the present catalytic system enables to complete the reaction in a time considerably shorter than other catalytic systems. Namely, reaction proceeds sufficiently in several to 10 hours with the present catalytic system.

The polymerization reaction is carried out in the presence or in the practical absence of solvent. As a solvent to be used, a halogenated hydrocarbon is preferred. For example, carbon tetrachloride, chloroform, tetrachloroethylene, trichloroethylene, 1,2-dichloroethylene, 1,2-dichloroethane, amyl chloride, monochlorobenzene, monobromobenzene, dichlorobenzene or the like is used. Besides halogenated hydrocarbon, tetrahydrofuran, n-heptane dimethyl formamide, acetone, ethyl acetate, acetyl acetone or the like is also useful, but the yield is generally lower than the case where chlorinated hydrocarbon is used. Further when vinyl chloride and vinylidene chloride is to be copolymerized, one of them as a comonomer, itself, can be used also as a solvent to perform simultaneous function. If such a case is expressed by another way, it is called the case of non-solvent polymerization. Not only in the case of copolymerization reaction, such a non-solvent polymerization reaction can be applied also to the case of homopolymerization. Since each constituent is prepared sometimes in a solution of n-hexane, tolune or the like, the presence of such a small amount of solvent is considered to belong to the non-solvent case where the presence of solvent is substantially none. When compared with the solvent case, the non-solvent case has such advantages that since it does not use the solvent, the solvent purification and recovery are unnecessary and the recovery of unreacted monomer is almost quantitative. Besides these, following advantages also are to be noted: the reaction proceeds smoothly even at a relatively low temperature, the polymerization speed is high, and resultant polymer is fine powder possessing high molecular weight which hardly contains tetrahydrofuran-insoluble, easy in shaping films and affords highly transparent films.

It has been proved that the vinyl polymer is not colored and shows hardly any dehydrochlorination. This fact will be explained in the case of polyvinyl chloride. When other types of Ziegler catalyst are used, the chlorine content of resultant polyvinyl chloride is usually lower than the theoretical value of 56.73%. This shows the occurrence of dehydrochlorination. Whereas the chlorine content of the polyvinyl chloride of the present invention is in the range of 55.6–56.8% which is approximately identical with the theoretical value. The ratio of the extinction degres at 638 cm.$^{-1}$ and 690 cm.$^{-1}$ in the infra-red spectrum is used in the calculation of the degree of syndiotacticity. Since this value is identical with or greater than the value of the polyvinyl chloride obtained in the usual radical polymerization, it can be said that the polyvinyl chloride of the present invention is rich in syndiotacticity.

The present method can be applied not only to the homopolymerization of vinyl chloride or vinylidene chloride but also to the copolymerization.

Exemplary comonomers include vinyl compounds such as vinyl acetate, vinyl chloride (to vinylidene chloride), vinylidene chloride (to vinyl chloride), styrenes such as styrene, alkyl vinyl ethers such as cetyl vinyl ether, isobutyl vinyl ether, alkyl acrylates or methacrylates such as methyl acrylate, methyl methacrylate, nitriles such as acrylonitrile, monoolefins such as ethylene, propylene, butene-1, 4-methyl pentene-1, trichloroethylene, diolefins such as butadiene and polymerizable unsaturated carboxylic acid esters such as di(2-ethyl hexyl) maleate, ethyl crotonate. Resultant copolymers are isolated from homopolymers by fractionational precipitation using a solvent. The presence of comonomer constituent in the copolymer is detected by the result of elementary analysis or infrared spectrum. The characteristic point of the copolymerization reaction using the present catalyst system is to provide a homogeneous copolymer containing hardly homopolymers.

Following examples are given to illustrate the present invention but they are by no means intended to limit the invention.

In each examples the indices apeparing immediately after the numbers of examples show the kind of monomer used; whether or not solvent is used, and the kind of catalyst used, in this order. The part in the parenthesis means that the isolated reaction product between the components in the parenthesis is used together with the other component outside of the parenthesis, that is, a transition metal compound which is abbreviated to M, here.

EXAMPLES 1–7

VC; non-solvent; M+(AlEt$_3$-MEA)

Various amounts of the reaction product of triethylaluminum and monoethanolamine (mol ratio 1:1) (hereinafter referred to AlEt$_3$-MEA, the method for preparing this product is disclose din the Japanese patent publication No. 2577/1967) and then 8.4 gr. of vinyl chloride monomer were charged to a reaction tube cooled at −78° C. in the atmosphere of nitrogen. Further, 0.5 ml. of n-hexane solution of Ticl$_4$ having a concentration of 0.607 millimole/ml. (abs. amount of Ticl$_4$:0.303 millimole) was added to the mixture. After closing the reaction tube by fusion, the polymerization was carried out at 30° C. for 24 hrs. under shaking.

The reaction system took gradually a suspension state showing greyish brown to greyish yellow color. With the advancement of the reaction, the whole system became almost immobile state. After completion of the reaction, the reaction tube was cooled again to −78° C. and opened. Then, reaction mixture was introduced in a large amount of methanol containing hydrochloric acid to precipitate white material, which was then filtered, washed with methanol and dried. Resultant product was, if necessary, purified by reprecipitation from tetrahydrofuran and methanol. The melting points of the products were measured. The analysis of chlorine was also carried out to confirm whether or not dehydrochlorination of the polymer had occurred. The infrared spectrum of powdery polymer in the region of 600 cm.$^{-1}$ to 800 cm.$^{-1}$ using KBr disk was measured and the ratio of the optical densities at 638 cm.$^{-1}$ and 690 cm.$^{-1}$, D638/D690, was calculated by way of base line method in order to investigate the syndiotacticity of the polymer. Results are listed in Table 1. In these Examples, the effect of the mol ratio of the catalyst constituents (indicated by the ratio of Al/Ti) on the yield and properties of polymer was studied.

TABLE 1

| Example Number | Al/Ti (molar ratio) | Product (gr.) | Yield (percent) | Cl (percent) | D638/D690 | M.P. (° C.) |
|---|---|---|---|---|---|---|
| 1 | 0.6 | 0.79 | 9.5 | | | |
| 2 | 0.9 | 0.90 | 10.7 | 55.9 | 1.81 | 140–145 |
| 3 | 2.5 | 1.73 | 20.7 | | | |
| 4 | 3.4 | 2.51 | 30.0 | 56.1 | 1.49 | 137–151 |
| 5 | 4.6 | 3.78 | 45.0 | 56.1 | 1.81 | 152–159 |
| 6 | 7.1 | 1.95 | 23.2 | 56.0 | 1.66 | 150–156 |
| 7 | 10.0 | 1.54 | 18.4 | 55.6 | 1.67 | 148–160 |

The value D638/D690 of the commercial polyvinyl chloride obtained by the radical polymerization method was measured in the control run. It was 1.25.

EXAMPLES 8–19

VC; non-solvent; M+(AlEt$_3$-alkanolamine)

Hundred ml. of vinyl chloride monomer was introduced in a 200 ml. pressure resistant glass reaction tube equipped with an electromagnetic stirrer, and two copper pipes one of which was used for connecting to a vacuum source or nitrogen source or for introducing a monomer or a monomer mixture and the other of which was used for connecting to a manometer or for purging the unreacted monomer, after the operations of connecting the tube to the vacuum source then to the nitrogen source were repeated and the tube was cooled to −20° C. Then, 1–2 ml. of toluene solution of the reaction product between triethyl aluminum and alkanolamine (1:1) and 1–2 ml. of toluene solution of a compound of transition metal were introduced in the reaction tube which was then closed. The polymerization was carried out with vigorous agitation while maintaining the temperature of the bath of the reaction tube at 25–30° C. During the polymerization which was continued for one to several hours, the vapor pressure of vinyl chloride monomer indicated always about 4 kg./cm.$^2$. After the completion of the reaction, the unreacted monomer was discharged and the reaction product was dropped into methanol containing hydrochloric acid to be precipitated. (If the precipitate was in the block form, it was chopped with a Waring Blendor.) The precipitated reaction product, after being left to stand for over night, was washed with methanol, dried and weighed. If necessary, the polymer was purified by reprecipitation from tetrahydrofuran and methanol. The mean polymerization degree of the polymer was measured by the method shown in JISK–6721 (1959). Namely, 0.4 gr. of the polymer was dissolved in 100 ml. of nitrobenzene and the relative viscosity of the resultant solution was measured with an Ubbelohde viscosimeter at 30° C. The mean polymerization degree of the polymer was calculated from this value.

The reaction product of triethyl aluminum-alkanolamine had been prepared by the following process. [Triethylaluminum-isopropanolamine (1:1) reaction product] (abbreviated as AlEt$_3$-iPA)

3.27 gr. of triethylaluminum was diluted with a mixture liquid of 8 ml. of n-hexane and 4 ml. of toluene and the resultant solution was cooled to −78° C. 2.2 ml. of isopropanolamine was gradually added. As in the case of monoethanolamine, the reaction product was treated to yield 2.56 gr. of colorless needle crystal. The product has a solubility to toluene, or n-hexane, greater than the reaction product between triethylaluminum and monoethanolamine (1:1).

[Triethylalminum-n-propanolamine reaction product (1:1)] (AlEt$_3$-n-PA)

As in the case of isopropanolamine, the reaction product between triethylaluminum and n-propanolamine (3-amino-n-propanol), (1:1), was prepared.

Isolated product was colorless plate crystal having a M.P. of 90–92° C. Results are listed in Table 2. As evident from the result, it can be seen that the mean polymerization degree of the resultant polymer was fairly high, and the catalyst activity is also sufficiently high compared with other catalyst systems.

TABLE 2

| Example Number | AlEt₃-alkanolamine reaction product (mmol.) | Transition Metal Compound | Al/Ti (molar) ratio | Polymerization Temp. (°C.) | Time (hr.) | Product (gr.) | Polymer Cl (percent) | D638/D690 | M.P. (°C.) | $\overline{DP}$ |
|---|---|---|---|---|---|---|---|---|---|---|
| 8 | AlEt₃-MEA, 5.00 | TiCl₄ | 2.5 | 25 | 4.5 | 22.6 | | 1.66 | | 1,600 |
| 9 | AlEt₃-MEA, 4.75 | VOCl₃ | 3.1 | 23 | 2.0 | 22.2 | 56.6 | 1.39 | 200–210 | 1,600 |
| 10 | AlEt₃-MEA, 8.00 | VOCl₃ | 4.0 | 28 | 1.0 | 18.8 | | 1.59 | 172–177 | 1,200 |
| 11 | AlEt₃-nPA, 8.00 | VOCl₃ | 4.0 | 30 | 5.0 | 24.8 | | 1.57 | 175–180 | 1,200 |
| 12 | AlEt₃-iPA, 4.08 | VOCl₃ | 3.0 | 23 | 2.0 | 14.9 | 56.2 | 1.48 | 190–200 | 1,700 |
| 13 | AlEt₃-MEA·HCl, 3.70 | VOCl₃ | 3.1 | 32 | 4.5 | 6.4 | 56.7 | 1.57 | 150–155 | 1,900 |
| 14 | AlEt₃-MEA, 1.56 | VOCl₃ | 1.0 | 30 | 1.0 | 9.1 | 56.5 | 1.60 | 120–130 | 1,580 |
| 15 | AlEt₃-MEA, 3.12 | VOCl₃ | 2.0 | 30 | 1.0 | 15.9 | 56.0 | 1.62 | 122–130 | 1,600 |
| 16 | AlEt₃-MEA, 4.68 | VOCl₃ | 3.0 | 30 | 1.0 | 20.1 | 56.1 | 1.53 | 125–131 | 1,250 |
| 17 | AlEt₃-MEA, 9.36 | VOCl₃ | 6.0 | 30 | 1.0 | 20.0 | 56.3 | 1.57 | 124–128 | 680 |
| 18 | AlEt₃-MEA, 15.60 | VOCl₃ | 10.0 | 30 | 1.0 | 18.3 | 55.9 | 1.40 | 120–125 | 500 |
| 19 | AlEt₃-MEA,ᵇ 6.66 | VOCl₃ | 3.0 | 30 | 1.0 | 24.9 | | 1.51 | | 2,300 |
| Ref. a | AlEt₃,ᶜ 4.68 | VOCl₃ | 3.0 | 30 | 1.0 | 1.0 | | | | |
| Ref. b | AlEt₃,ᶜ 4.68 | VOCl₃ | 3.0 | 30 | 1.0 | 1.0 | | | | |
| Ref. c | AlEt₂(OEt),ᶜ 4.68 | VOCl₃ | 3.0 | 30 | 1.0 | 4.0 | | | | |
| Ref. d | AlEt₂(OEt),ᶜ 4.68 | VOCl₃ | 3.0 | 30 | 1.0 | 3.7 | | | | |

ᵃ HCl salt of monoethanolamine was used.
ᵇ This aluminum compound was not crystalline but powdery.
ᶜ The experiments carried out by the use of the catalyst described in U. Giannini, S. Cesca, Chim. Ind. (Milan) 44, 371 (1962) and Belg. 611, 654 (Jan. 15, 1962).

The polymers obtained in the runs a and b were colored in pale yellow.

EXAMPLES 20–27

VC; non solvent; M+(AlEt₃- N-substituted-alkanolamine)

Various amounts of triethyl aluminum was charged to a glass vessel which had been flushed with nitrogen sufficiently. Then the vessel was weighed. A 1:1 mixture of toluene and n-hexane in an approximately equal amount to triethylaluminum was added to dilute triethylaluminum. After the vessel was cooled to −78° C., N-substituted alkanolamine was gradually added so as to amount to equimol to triethylaluminum. At this time, both react vigorously accompanying heat and gas evolution. After the completion of the addition of all the N-substituted alkanolamine, the whole was further heated to complete the reaction and to give a homogeneous transparent solution. When the reaction liquid was cooled, crystal was precipitated, and after the completion of the precipitation, the supernatant liquid was removed by decantation or by drawing with a syringe, and n-hexane was newly added. The crystal was heated with stirring until it was dissolved in n-hexane. The solution was cooled again to precipitate crystal. After 3 to 5 times repetition of this operation for the purpose of purification, the crystal was dried at a reduced pressure to yield pure crystalline substance. Resultant crystals were all colorless in the needle or plate form. The yield was 80 to 90% relative to the theoretical value. The aluminum content of the resultant crystal was analyzed quantitatively by the oxine method using 8-oxyquinoline. The quantitative determination of the active ethyl radical being given by the number of ethyl radical per aluminum atoms was effected by measuring the amount of ethane gas produced by the hydrolysis. The measurement of molecular weight was effected by the freezing point method using a benzene solution. The results are shown in Table 3.

TABLE 3

| N-substituted Alkanolamine | Al (percent) Found | Al (percent) Calcd. | Et-group Found | Et-group Calcd. | Mol. Wt. Found | Mol. Wt. Calcd. |
|---|---|---|---|---|---|---|
| Monoethanolamine | 18.41 | 18.60 | 2.0 | 2.0 | 290 | 145.2 |
| N-methylethanolamine | 16.94 | 16.95 | 2.0 | 2.0 | 323 | 159.2 |
| N,N-dimethylethanolamine | 15.54 | 15.58 | 2.0 | 2.0 | | 173.2 |
| N-ethylethanolamine | 15.13 | 15.58 | 1.8 | 2.0 | 333 | 173.2 |
| N,N-diethylethanolamine | 13.31 | 13.40 | 2.0 | 2.0 | 408 | 201.3 |
| N,N-dicyclohexylethanolamine | 8.83 | 8.72 | 2.2 | 2.0 | 733 | 309.5 |
| N-phenylethanolamine | 12.07 | 12.19 | 1.8 | 2.0 | 471 | 221.3 |
| N,N-diphenylethanolamine | 8.95 | 9.07 | 2.0 | 2.0 | 605 | 297.4 |

Note.—The calculated values are obtained on the basis of the formula of AlEt₂(OCH₂·CH₂NRR′).

These compounds exist in benzene usually in the form of dimer. When they are used as a constituent of a catalyst, all of the calculation of mol ratio is effected as a monomer. The NMR spectra of these compounds were also measured.

The polymerization of vinyl chloride was carried out by the following process.

A 200 ml. pressure glass reaction vessel equipped with an electromagnetic stirrer was flushed with nitrogen, evacuated and cooled to −20° C. Hundred gr. of vinyl chloride and then 5.45 millimole of the reaction product of triethylaluminum and N-substituted alkanolamine (1:1) in toluene were introduced to the vessel. Then with stirring, a compound of transition metal was added to the mixture, so as to give a mol ratio of 1/3.5 (compound of trransition metal: reaction product). If necessary, further toluene was added so as to make the amount of toluene in the reaction system constant. In all the runs of these examples, the total amount of toluene used was 5 ml. and accordingly the polymerization was carried out under the condition which could be called practically non-solvent polymerization.

The reaction tube was heated to 30° C. and the polymerization was started. The reaction system took gradually the suspension state on account of the polymer produced and finally reached the state where any liquid monomer could apparently be observed. After one hour of polymerization, the resultant polymer was processed as in the foregoing examples, dried to yield white powder polymer which was then weighed. The results are shown in Table 4. In the table, R and R' indicate H or the N-substituent of the catalyst constituent expressed by the general formula of AlEt$_2$(OCH$_2$CH$_2$NRR').

TABLE 4

| Example | R, R' | Transition Metal Compound | Polymer Product (gr.) | Cl (percent) | D638 / D690 | M.P. (° C.) | $\overline{DP}$ |
|---|---|---|---|---|---|---|---|
| 20 | H, CH$_3$ | VOCl$_3$ | 17.2 | 56.2 | 1.68 | 123–125 | 1,000 |
| 21 | CH$_3$, CH$_3$ | VOCl$_3$ | 13.8 | 56.5 | 1.62 | 119–124 | 980 |
| 22 | CH$_3$, CH$_3$ | TiCl$_4$ | 4.3 | 56.8 | 1.77 | 115–119 | 260 |
| 23 | H, C$_2$H$_5$ | VOCl$_3$ | 19.0 | 56.8 | 1.66 | 130–135 | 990 |
| 24 | H, C$_2$H$_5$ | TiCl$_4$ | 12.5 | 56.1 | 1.77 | 120–125 | 330 |
| 25 | C$_2$H$_5$, C$_2$H$_5$ | VOCl$_3$ | 12.9 | 56.4 | 1.63 | 114–116 | 1,180 |
| 26 | H, C$_6$H$_5$ | VOCl$_3$ | 18.6 | 56.6 | 1.70 | 135–139 | 820 |
| 27 | C$_6$H$_5$, C$_6$H$_5$ | VOCl$_3$ | 5.6 | 56.0 | 1.66 | 123–125 | 1,100 |

As evident from the above-mentioned result, it can be seen that the effect of N-substituent is great when the reaction product of triehyl aluminum and N-substituted alkanolamine (1:1) combined with a compound of transition metal is used and the catalyst activity is higher in the case of mono-substituent than in the case of di-substituent.

EXAMPLE 28

VC; M+(AlEt$_3$-N-ethyl-monoethanolamine)

Fifty gr. of vinyl chloride was introduced at −20° C. in a reaction vessel flushed with nitrogen. 50 ml. of carbon tetrachloride was added thereto and stirred. After 5 minutes later, 2.34 millimoles of the reaction product of triethylaluminum and N-ethyl-monoethanolamine (1:1) in toluene and 0.78 millimole of vanadium oxytrichloride in toluene were added and the polymerization was carried out at 30° C. for one hour. 5.5 gr. of polyvinyl chloride was obtained.

In this polymerization, when 4.68 millimoles of triethylaluminum, 9.36 millimoles of N-ethyl-monoethanolamine and 1.56 millimoles of vanadium oxytrichloride each in toluene were added to the monomer in this order and the polymerization was carried out, 2.3 gr. of polyvinyl chloride was obtained.

EXAMPLES 29 AND 30

VC; nonsolvent; M+AlEt$_3$+HOCH$_2$CH$_2$CN 4.41 gr. of triethyl aluminum was dissolved in a liquid mixture of 8 ml. of toluene and 8 ml. of n-hexane, and the resultant solution was cooled to −78° C. 2.6 ml. of purified ethylene cyanohydrin was added to prepare a catalyst component consisting of a mixture of triethyl aluminum and ethylene cyanohydrin which was further mixed with TiCl$_4$ to give a molar ratio of 1:1. Polymerizations were carried out in the same manner as in Examples 1–7. Results thus obtained are shown in Table 5.

TABLE 5

|  | TiCl$_4$ (mmol.) | Polymer Product (gr.) | Yield (percent) |
|---|---|---|---|
| Example Number: |  |  |  |
| 29 | 1.5 | 1.40 | 16.7 |
| 30 | 0.8 | 1.53 | 18.2 |

EXAMPLES 31 AND 32

VC; nonsolvent; M+AlEt$_3$+COCH$_2$CH$_2$X (X: Cl or Br)

1.22 gr. of triethyl aluminum was dissolved in a liquid mixture of 5 ml. of toluene and 5 ml. of n-hexane, and the resultant solution was cooled to −78° C. 0.7 ml. of ethylene chlorohydrin was gradually added and the mixture was heated to 50–60° C. to complete the reaction between the both components. The reacted mixture formed a colorless, transparent solution.

Polymerizations were carried out in the same procedure as in Examples 8–19, using a catalyst consisting of 9.60 millimoles of the reacted mixture and 2.40 millimoles of vanadium oxytrichloride.

19.5 gr. of polyvinyl chloride was obtained after the polymerization for 1.5 hours at 24° C. This polymer had a M.P. of 145–152° C., a chlorine content of 56.6%, D638/D690 of 1.48 and a mean polymerization degree of 1400.

Except that ethylene bromohydrin was used instead of chlorohydrin, polymerization was carried out for one hour in almost the same procedure as in the above-mentioned 16.3 gr. of polymer was obtained.

EXAMPLES 33–48

VC; solvent; M+(AlEt$_3$-MEA)

100 ml. of halogenated hydrocarbon, a given amount of reaction product of triethyl aluminum and monoethanol amine (1:1) and a given amount of a compound of a transition metal, each by themselves or each in the form of benzene solutions were sealed into separate glass ampoules, respectively. The sealed ampoules were charged into a 300 ml. autoclave which effected up and down stirring. The autoclave was closed under the nitrogen atmosphere and then flushed several times with dry nitrogen gas.

The glass ampoules were crushed by nitrogen pressure of ten and odds kg./cm.$^2$ applied to the autoclave and then the autoclave was heated in an electric furnace to a given temperature with stirring for 10 minutes. Thereafter, vinyl chloride monomer was introduced under pressure and polymerization was started under 5 kg./cm.$^2$. After the polymerization for a given period, the autoclave was cooled. The content was poured into methanol (which might contain a suitable amount of hydrochloric acid) to precipitate polymer. After standing over night, the polymer was washed with methanol, filtered and dried. White powder of polyvinyl chloride was obtained. The reaction conditions and results are shown in the following Table 6.

TABLE 6

| Example Number | AlEt₃-MEA (mmol.) | Transition Metal Compound (mmol.) | Solvent | Polymerization Temp. (°C.) | Polymerization Time (hr.) | Polymer Product (gr.) | $\overline{DP}$ | M.P. (°C.) |
|---|---|---|---|---|---|---|---|---|
| 33 | 20.4 | TiCl₄, 2.05 | CCl₄ | 80 | 10 | 16.9 | | 150 |
| 34 | 10.2 | TiCl₄, 2.05 | CCl₄ | 80 | 6 | 13.4 | 72 | 113 |
| 35 | 20.4 | TiCl₄, 2.05 | EDC* | 80 | 6 | 16.2 | 160 | 137 |
| 36 | 34.2 | TiCl₃, 3.43 | EDC | 80 | 5 | 11.1 | | 160 |
| 37 | 17.3 | TiCl₃, 3.43 | EDC | 80 | 6 | 13.7 | | |
| 38 | 34.2 | TiCl₃, 3.43 | CCl₄ | 80 | 6 | 14.6 | | |
| 39 | 17.3 | TiCl₃, 3.43 | CCl₄ | 80 | 6 | 18.3 | | |
| 40 | 17.3 | TiCl₃, 3.43 | C₆H₅Cl | 80 | 6 | 5.5 | | 145 |
| 41 | 17.3 | VOCl₃, 1.76 | EDC | 80 | 6 | 21.3 | | 160 |
| 42 | 10.0 | Fe (acac)₃, 2.00 | EDC | 60 | 6 | 2.0 | | |
| 43 | 10.0 | Fe (acac)₂, 2.00 | EDC | 60 | 6 | 3.0 | | |
| 44 | 10.0 | Co (acac)₃, 2.00 | EDC | 60 | 6 | 4.4 | | |
| 45 | 10.0 | Co (acac)₂, 2.00 | EDC | 60 | 6 | 3.8 | | |
| 46 | 10.0 | Ni (acac)₂, 2.00 | EDC | 60 | 6 | 2.0 | | |
| 47 | 10.0 | Cr (acac)₃, 2.00 | EDC | 60 | 6 | 3.8 | | |
| 48 | 10.0 | Zr (acac)₄, 2.00 | EDC | 60 | 6 | 3.6 | | |

*EDC: 1.2-dichloroethane.

EXAMPLES 49–56

VC; solvent; M+(AlEt₃-MEA)

Polymerizations of vinyl chloride were carried out using a catalyst consisting of a reaction product between triethyl aluminum and monoethanolamine (1:1) and a compound of transition metal, each in a given amount.

A 200 ml. reaction tube of pressure resistant glass equipped with an electromagnetic stirrer was flushed with nitrogen. After 1,2-dichloroethane as a polymerization solvent was poured into the tube, a compound of transition metal and the above-mentioned reaction product as a catalyst component were added in that order. The tube was closed. After nitrogen gas in the tube was replaced by vinyl chloride, vinyl chloride was introduced under pressure with stirring. Polymerization was continued at a given pressure, a given temperature and for a given period. After completion of the reaction, the product was treated as in Examples 33–48. Polyvinyl dichloride of white powder was obtained. The reaction conditions and results are shown in the following Table 7.

TABLE 7

| Example Number | AlEt₃-MEA (mmol.) | Transition Metal Compound (mmol.) | Solvent (ml.) | Polymerization Press. (kg./cm.²) | Polymerization Temp. (°C.) | Polymerization Time (hr.) | Polymer Product (gr.) | $\overline{DP}$ |
|---|---|---|---|---|---|---|---|---|
| 49 | 5.2 | VOCl₃, 2.3 | EDC, 75 | 2.0 | 18 | 3 | 10.1 | 1,310 |
| 50 | 10.0 | CrO₂Cl₂, 4.6 | EDC, 70 | 2.5 | 32 | 3 | 3.3 | 373 |
| 51 | 10.0 | CrO₂Cl₂, 4.6 | EDC, 70 | 2.5 | 32 | 6 | 6.0 | 432 |
| 52 | 10.0 | CrO₂Cl₂, 4.6 | EDC, 70 | 2.5 | 32 | 24 | 24.9 | 1,140 |
| 53 | 10.0 | CrO₂Cl₂, 4.6 | EDC, 70 | 2.5 | 62 | 3 | 7.7 | 245 |
| 54 | 10.0 | CrO₂Cl₂, 4.6 | EDC, 70 | 2.5 | 62 | 6 | 12.2 | 270 |
| 55 | 10.0 | CoCl₂, 2.0 | EDC, 70 | 2.5 | 62 | 3 | 4.4 | 225 |
| 56 | 10.0 | CrO₂Cl₂, 4.6 | n-C₆, 70 | 2.5 | 62 | 6 | 2.2 | |
| Control | 10.0 | None | EDC, 70 | 2.5 | 62 | 3 | 0.1 | |

EXAMPLES 57–62

VC; solvent; M+AlEt₃+alkanolamine

A 300 ml. autoclave of up and down stirring type (used in Examples 57–61) or a 200 ml. pressure resistant glass reaction tube equipped with an electromagnetic stirrer (as in Example 62) was used as a reaction vessel. 100 ml. of 1,2-dichloroethane and a given amount of monoethanol amine or diethanol amine and then given amounts of an organic aluminum compound and a compound of transition metal, each by themselves or each in the form of solutions were sealed into separate glass ampoules, respectively. These ampoules were charged into the reaction vessel.

Polymerization and treatment of product were carried out according to the procedure of Examples 33–48. White powder of polyvinyl chloride was obtained. The reaction conditions and results are shown in the following Table 8.

TABLE 8

| Example Number | Transition Metal Compound (m.mol.) | Organo Al Compound (m.mol.) | Ethanolamine (mmol.) | Solvent (ml.) | Polymerization Press. (kg./cm.²) | Polymerization Temp. (°C.) | Polymerization Time (hr.) | Polymer Product (gr.) |
|---|---|---|---|---|---|---|---|---|
| 57 | TiCl₄, 1.73 | AlEt₃, 17 | MEA, 17 | EDC, 100 | 5 | 80 | 6 | 10.1 |
| 58 | TiCl₃, 1.54 | AlEt₃, 15 | MEA, 15 | EDC, 100 | 5 | 80 | 6 | 3.8 |
| 59 | Ti(OAc)₂Cl₂ 1.40 | AlEt₂Cl, 14 | MEA, 14 | EDC, 100 | 5 | 80 | 6 | 20.1 |
| 60 | TiCl₃, 1.42 | AlEt₃, 14 | DEA, 14 | EDC, 100 | 5 | 80 | 6 | 2.0 |
| 61 | Ti(OPr₂(acac)₂*, 7.88 | AlEt₃, 79 | MEA, 79 | ECC, 100 | 5 | 80 | 6 | 1.7 |
| 62 | CrO₂Cl₂, 4.60 | AlEt₃, 10 | MEA, 10 | EDC, 100 | 2.5 | 62 | 6 | 8.5 |

*Ti(OPr)₂(acac)₂: Titanium diisopropoxybisacetylacetonate.

EXAMPLES 63–66

VC; solvent; M+(AiEt₃−MEA)+AlEt₃ or AlEt₂Cl

After a 50 ml. pressures glass tube (ampoule) was flushed with nitrogen gas, 20 ml. of 1,2-dicholroethane, 1.0 millimole of vanadium oxytrichloride and a given amount of various organic aluminum compounds were introduced into the ampoule in that order.

Next, the ampoule was connected to a vacuum source and 10.6 gr. of vinyl chloride monomer was introduced in the pressure-reduced ampoule from a distillation flask. The ampoule was melt-sealed.

Polymerization was carried out at 60° C., for 6 hours, with shaking. Treatment of resultant polymer was carried out as in Examples 33-48. Catalysts and results are shown in the following Table 9 below.

The polymers obtained were all white. When the reaction product between triethyl aluminum and monaethanolamine (1:1) and additional triethyl aluminum or diethyl aluminum monochloride equimolecular to the reaction product were used together as in the present Examples 64-66, it was observed from analysis of chlorine content, infrared spectrum and nuclear magnetic resonance spectrum of the polymers that dehydrochlorination did not occur also in these cases.

TABLE 9

| Number | Organic Al Compound Component | Polymer Yield (percent) | $\overline{DP}$ |
|---|---|---|---|
| 63 | AlEt$_3$-MEA, 3.0 mmol | 46 | 230 |
| 64 | AlEt$_3$-MEA, 1.5 mmol. plus AlEt$_3$, 1.5 mmol | 63 | 400 |
| 65 | AlEt$_3$-MEA, 2.5 mmol. plus AlEt$_3$, 2.5 mmol | 74 | 210 |
| 66 | AlEt$_3$-MEA, 1.5 mmol. plus AlEt$_2$Cl, 1.5 mmol | 47 | 380 |

EXAMPLES 67-75

VC+vinyl compound; non solvent; M+(AlEt$_3$—MEA)

Copolymerization of vinyl chloride with various compounds were carried out using, as one component of catalyst, the reaction product between triethyl aluminum and monoethanolamine (1:1), in almost the same manner as in Examples 8-19. 5 ml. of comonomer was poured into vinyl chloride monomer excepting the Example 67 wherein 10 ml. of comonomer was used instead of 5 ml. In them case of block copolymerization, a homopolymerization of vinyl chloride was at first carried out for a given period, and then the polymerization vessel was cooled to −20° C. again to add a comonomer and to extend the polymer chain by copolymerization.

The results obtained are shown in the following Table 10.

EXAMPLES 76-83

VC+vinyl compound; solvent; M+(AlEt$_3$—MEA)

Copolymerization of vinyl chloride with other vinyl compounds were carried out using a solvent.

A given amount of 1,2-dichloroethane was poured into a 200 ml. pressure resistant glass reaction tube equipped with an electro-magnetic stirrer after flushing the tube with nitrogen gas. Vinyl chloride monomer was dissolved in this 1,2-dichloroethane under pressure and was driven off. Next, given amounts of a catalyst and a comonomer were added into the tube with stirring, and the tube was closed.

Vinyl chloride was introduced under pressure with stirring and polymerization was carried out under conditions of given pressure, temperature and period.

After completion of the reaction, methanol (which might contain a suitable amount of hydrochloric acid) was poured into the reaction liquid, polymer being precipitated. Resultant polymer was washed with methanol, filtered and dried at 40° C. in vacuo for 24 hours. The polymer was white powder. The reaction conditions and results are shown in the following Table 11 below.

The unit of vinyl acetate, methyl acrylate or ethyl vinyl ether present in the copolymers of the present Examples 76-83 was confirmed from infrared spectrum. The comonomer contents in the copolymers were calculated from analytical value of chlorine.

TABLE 10

| Example Number | AlEt$_3$– MEA$_3$ (mmol.) | Transition Metal Compound | Al/Ti (molar ratio) | Comonomer | Polymerization Temp. (° C.) | Polymerization Time (hr.) | Polymer Product (gr.) | Acetone Extraction Soluble (Weight prcent) | Acetone Extraction Insoluble (Weight percent) |
|---|---|---|---|---|---|---|---|---|---|
| 67 | 4.75 | TiCl$_4$ | 3.12 | Cetylvinyl ether | 26 | 2 | 11.2 | 14.7 | 85.3 |
| 68 | 5.70 | TiCl$_4$ | 3.12 | Vinyl acetate | 23 | 1 | 13.9 | 32.2 | 67.8 |
| 69 | 4.75 | TiCl$_4$ | 3.12 | Isobutylvinyl ether | 23 | 2 | 15.1 | 31.7 | 68.3 |
| 70 | 4.75 | TiCl$_4$ | 3.12 | do | 23 | 2+2 | 8.6 | | |
| 71 | 4.75 | VOCl$_3$ | 3.08 | Vinyl acetate | 23 | 0.5+2 | 17.9 | 8.0 | 92.0 |
| 72 | 4.75 | TiCl$_4$ | 3.12 | Maleic acid di-(2-ethyl hexyl) | 23 | 2 | 14.9 | | |
| 73 | 4.75 | VOCl$_3$ | 3.04 | do | 27 | 2 | 30.2 | | |
| 74 | 4.75 | VOCl$_3$ | 3.08 | do | 27 | 0.3+2 | 24.5 | | |
| 75 | 9.50 | VOCl$_3$ | 3.08 | Styrene | 27 | 0.5+2.5 | 19.0 | 20.4 | 79.6 |

As seen in the table, in the cases of block copolymerizations, the polymerization times are indicated in two steps; homopolymerization and copolymerization.

The presence of comonomer unit was confirmed from infrared spectrum, in both the acetone-soluble parts and acetone-insoluble parts of the polymers in the cases of Examples 68, 69 and 71, and in the acetone-insoluble part of the polymer in the case of Example 67.

EXAMPLES 84-98

VC+olefin; solvent; M+(AlEt$_3$—MEA) or M+AlEt$_3$+MEA

Copolymerizations of vinyl chloride with olefins were carried out using such a ctalyst system as in Examples 84-90, consisting of a compound of transition metal, triethyl aluminum and monoethanolamine, each in a given

TABLE 11

| Example Number | AlEt$_3$- MEA (mmol.) | Transition Metal Compound (mmol.) | Solvent (ml.) | Comonomer (gr.) | Polymerization Press. (kg./cm.$_2$) | Polymerization Temp. (° C.) | Polymerization Time (hr.) | Copolymer Product (gr.) | $\overline{DP}$ | Comonomer Content (mol percent) |
|---|---|---|---|---|---|---|---|---|---|---|
| 76 | 5.2 | VOCl$_3$, 2.3 | EDC, 75 | Vinylacetate, 2.8 | 2.0 | 30 | 2 | 5.9 | 700 | 3.3 |
| 77 | 5.2 | VOCl$_3$, 2.3 | EDC, 75 | Methyl acrylate, 2.9 | 2.0 | 30 | 2 | 5.5 | | 27.0 |
| 78 | 10.0 | CrO$_2$Cl$_2$, 4.6 | EDC, 75 | Vinyl acetate, 3.0 | 2.5 | 32 | 3 | 5.7 | 510 | 3.0 |
| 79 | 10.0 | CrO$_2$Cl$_2$, 4.6 | EDC, 75 | Vinyl acetate, 10.0 | 2.5 | 32 | 6 | 9.4 | 558 | 8.6 |
| 80 | 10.0 | CrO$_2$Cl$_2$, 4.6 | EDC, 75 | Methyl acrylate, 3.0 | 2.5 | 32 | 3 | 6.5 | 668 | 23.0 |
| 81 | 10.0 | CrO$_2$Cl$_2$, 4.6 | EDC, 75 | Methyl acrylate, 10.0 | 2.5 | 32 | 6 | 13.7 | 1,029 | 36.3 |
| 82 | 10.0 | CrO$_2$Cl$_2$, 4.6 | EDC, 75 | Ethyl vinyl ether, 5.0 | 2.5 | 32 | 6 | 1.3 | | 3.1 |
| 83 | 10.0 | CrO$_2$Cl$_2$, 4.6 | None | Vinyl acetate, 46.7 | 2.5 | 32 | 9 | 8.7 | | 34.8 | amount, or such a catalyst system as in Examples 91–98, consisting of a compound of transition metal and the reaction product between triethyl aluminum and monoethanolamine (1:1). A 300 ml. autoclave of up and down stirring type was used.

The copolymerization was carried out in the presence of 100 ml. of 1,2-dichloroethane as a polymerization solvent, at a total pressure of 10 kg./cm.² in which partial pressure of vinyl chloride was 5 kg./cm.² and that of olefin gas was 5 kg./cm.², at a given temperature and for a given period of time. In Examples 91–96, the copolymerization was carried out at first at 80° C. for 2 hours and then at 130° C. for 4 hours.

The reaction conditions and results are shown in the following Table 12.

sultant filtrate was poured into thrice its amount of methanol, and allowed to stand for 4 hours. After the resultant precipitate was ltered, the filterad polymer was dried in vacuo at 40° C. for 24 hours.

EXAMPLE 99

VC+CCl₂=CHCl; solvent; M+(AlEt₃-MEA)

70 ml. of trichloroethylene was poured into a 200 ml. pressure resistant glass reaction tube equipped with an electromagnetic stirrer, after flushing with nitrogen gas. Next, 4.6 millimole of chromyl chloride and 10.0 millimole of the reaction product between triethyl aluminum and monoethanolamine (1:1) were added thereto in that order, and the tube was closed.

TABLE 12

| Example Number | Transition Metal Compound (mmol.) | AlET₃ (mmol.) | MEA (mmol.) | Comonomer | Polymerization Temp. (° C.) | Polymerization Time (hr.) | Copolymer Product (gr.) | Copolymer M.P. (° C.) | DP | Comonomer content (mol percent) |
|---|---|---|---|---|---|---|---|---|---|---|
| 84 | TiCl₃, 1.5 | 15 | 15 | C₂H₄ | 80 | 6 | 2.13 | 100 | | |
| 85 | TiCl₄, 1.5 | 15 | 15 | C₂H₄ | 80 | 6 | 1.88 | 130 | | |
| 86 | VOCl₃, 1.5 | 15 | 15 | C₂H₄ | 80 | 6 | 1.53 | 130 | | |
| 87 | TiCl₃, 1.5 | 15 | 15 | C₃H₆ | 80 | 6 | 1.95 | 105 | | |
| 88 | Ti(OAc)₂Cl₂, 1.5 | 15 | 15 | C₃H₆ | 80 | 6 | 1.85 | 110 | | |
| 89 | TiCl₄, 1.5 | 15 | 15 | C₃H₆ | 80 | 6 | 1.76 | 96 | | |
| 90 | VOCl₃, 1.5 | 15 | 15 | C₃H₆ | 80 | 6 | 1.98 | 100 | | |
| 91 | TiCl₃, 1.5 | AlEt₃-MEA (mmol.), 15 | | C₂H₄ | 80° C. (2 hrs.) plus 130° C. (4 hrs.) | | 17.73 | 95–116 | | 6.9 |
| 92 | VOCl₃, 1.5 | AlEt₃-MEA (mmol.), 15 | | C₂H₄ | do | | 3.70 | 85 | | |
| 93 | TiCl₄, 1.5 | AlEt₃-MEA (mmol.), 15 | | C₃H₆ | do | | 3.86 | 85 | | |
| 94 | TiCl₃, 1.5 | AlEt₃-MEA (mmol.), 15 | | C₃H₆ | do | | 9.16 | 120 | | 7.0 |
| 95 | VOCl₃, 1.5 | AlEt₃-MEA (mmol.), 15 | | C₃H₆ | do | | 7.53 | 98 | | |
| 96 | TiCl₃, 1.5 | AlEt₃-MEA (mmol.), 15 | | n-C₄H₈ | do | | 0.97 | | | |
| 97 | CrO₂Cl₂, 4.6 | AlEt₃-MEA (mmol.), 10 | | C₂H₄ | 80 | 6 | 14.1 | 220 | | 4.7 |
| 98 | CrO₂Cl₂, 4.6 | AlEt₃-MEA (mmol.), 10 | | C₃H₆ | 80 | 6 | 10.4 | 165 | | 11.1 |

Infrared spectra of the polymers obtained in Examples 91 and 94 were compared with that of the homopolymer of vinyl chloride. It was observed that the absorption bands of 688 cm.⁻¹ and 635 cm.⁻¹ in the spectrum of the homopolymer of vinyl chloride changed to those of 683 cm.⁻¹ (shift), 635 cm.⁻¹ (intensity is reduced) and 751 cm.⁻¹ (new absorption) in the spectrum of the vinyl chloride-ethylene copolymer of Example 91, and to those of 683 cm.⁻¹ (shift) and 635 cm.⁻¹ (intensity is reduced) in the spectrum of the vinyl chloride-propylene copolymer of Example 94. It was further observed that the spectrum of the vinyl chloride-propylene copolymer had a new absorption band at 1381 cm.⁻¹ which was absent in the case of homopolymer of vinyl chloride.

Also, the nuclear magnetic resonance spectra of the polymers obtained in Examples 91 and 94 were compared with that of homopolymer of vinyl chloride. It was observed that as for the signals of polyvinyl chloride, i.e. a multiplet (CH) around τ=5.61 and a multiplet (CH₂) around τ=7.91, their intensities in the part of higher magnetic field side increased, whereas those in the part of lower magnetic field side decreased in both the vinyl chloride-ethylene copolymer obtained in Example 91 and the vinyl chloride-propylene copolymer obtained in Example 94. This fact evidently shows that many units of vinyl chloride adjasent to a unit of olefin exist in the polymer chain and is a proof of the formation of copolymer. It is also confirmed from the positions of the signals of ethylene unit or propylene unit appearing in the spectra of the polymers that not a mixture of polyvinyl chloride and polyolefin but a copolymer is formed.

In the present examples, the separation and purification of resultant copolymer of vinyl chloride with olefin were carried out as follows.

Raw polymer was added to 20 times its amount of tetrahydrofuran and extracted at room temperature for 12 hours. After insoluble polyolefin was filtered off, the re- After the nitrogen gas in the tube was replaced by vinyl chloride, vinyl chloride was charged under pressure with stirring, and polymerization was continued for 6 hours at 2.5 kg./cm.² and 32° C. The product was treated as in Examples 33–48 and 1.2 gr. of polymer was obtained. The result of elementary analysis was as follows. C: 33.8%, H: 4.1%, Cl: 60.5%.

It was confirmed from the above-mentioned chlorine content that vinyl chloride-trichloroethylene copolymer containing 8.06 mole percent of trichloroethylene was formed.

EXAMPLES 100–106

VDC; solvent; M+(AlEt₃-MEA)

Polymerization of vinylidene chloride was carried out using as catalyst, 5.0 millimole of the reaction produce between triethyl aluminum and monoethanolamine (1:1) and 2.5 millimole of various compounds of transition metal.

70 ml. of 1,2-dichloroethane was introduced into a 200 ml. pressure resistant glass reaction tube equipped with an electromagnetic type stirrer, after flushing with nitrogen gas. Next, a compound of transition metal and the above-mentioned reaction product were added in that order. Finally, 10 ml. of vinylidene chloride (0.125 mole, 12.1 gr.) was added and the tube was closed. Reaction was carried out at a given temperature and for a given period of time. After completion of the reaction, methanol (which might contain a suitable amount of hydrochloric acid) was added to the reaction liquid to precipitate the polymer. After allowed to stand over night, resultant polymer was filtered, washed with methanol and dried at 40° C. in vacuo for 24 hours. The polymers were white powder, the infrared spectra of which accorded completely with those of a radical polymerization product having good purity. The majority of white polymers produced using other modified Ziegler catalysts, have been found from infrared spectrum to contain in their polymer molecule chains such an irregular structure as seen in chlorinated polychloroprene or the like, on account of dehydrochlorination and various reactions accompanied. However, the above-mentioned fact cannot be seen in the polymers obtained in the present examples.

The reaction conditions and results are shown in the following Table 13.

TABLE 13

| Example Number | Transition Metal Compound | Polymerization | | Polymer Yield (percent) |
|---|---|---|---|---|
| | | Temp. (°C.) | Time (hr.) | |
| 100 | CrO$_2$Cl$_2$ | 60 | 3 | 18.6 |
| 101 | VOCl$_3$ | 60 | 3 | 24.0 |
| 102 | TiCl$_4$ | 60 | 3 | 7.7 |
| 103 | VOCl$_3$ | 60 | 13 | 59.1 |
| 104 | VOCl$_3$ | 60 | 40 | 82.1 |
| 105 | VOCl$_3$ | 30 | 3 | 13.0 |
| 106 | VOCl$_3$ | 90 | 3 | 33.8 |

EXAMPLE 107

VDC; solvent; M+AlEt$_3$+MEA 5.0 millimole of triethyl aluminum and 5.0 millimole of monoethanolamine were separately added to the reaction system, instead of the reaction product between triethyl aluminum and monoethanolamine (1:1) used in Example 101. Other conditions in polymerization were the same as those in Example 101. 2.1 gr. of white polymer was obtained.

EXAMPLES 108–111

VDC; solvent; M+(AlEt$_3$-MEA) (various amounts of catalyst and VDC)

In the present examples, polymerizations were carried out in the same way as in Example 101 which the catalyst system (Al/V=2) consisting of the reaction product between triethyl aluminum and monoethanolamine (1:1) and vanadium oxytrichloride (polymerization: 60° C., 3 hours) was used except that the amount of the catalyst and the amount of vinylidene chloride (VDC) charged were varied. In the examples in which the amount of the monomer was varied, the amount of 1,2-dichloroethane as a solvent was adjusted so as to give the total amount of the system consisting of solvent, monomer and catalyst, 85 ml. The reaction conditions and results are shown in the following Table 14. The polymers were all white powder.

TABLE 14

| | VOCl$_3$ (mmol.) | VDC Monomer Feed (ml.) | Polymer Yield (percent) |
|---|---|---|---|
| Example Number: | | | |
| 108 | 1.25 | 10 | 20.5 |
| 109 | 0.625 | 10 | 15.4 |
| 110 | 2.5 | 5 | 18.0 |
| 111 | 2.5 | 15 | 24.9 |

EXAMPLES 112–115

VDC; solvent; M+(AlEt$_3$-MEA)

(Various solvents)

Polymerizations were carried out in the same way as in Example 101, except that various solvents were used instead of 1,2-dichloroethane. The amounts of the solvents were all 70 ml. Resultant polymers were all white powder. The solvents and results are shown in Table 15.

TABLE 15

| | Solvent | Polymer Yield (percent) |
|---|---|---|
| Example Number: | | |
| 112 | CCl$_4$ | 24.2 |
| 113 | n-Heptane | 7.1 |
| 114 | Toluene | 14.9 |
| 115 | THF | 14.2 |

EXAMPLE 116

VDC; solvent; M+(AlEt$_3$-N,N-Ph$_2$-MEA)

Polymerization was carried out in the same way as in Example 101, except that a reaction product between triethyl aluminum and N, N-diphenyl monoethanolamine (1:1) was used instead of the reaction product between triethyl aluminum and monoethanolamine (1:1) used in Example 101. 2.11 gr. of polymer having a pale light blue color was obtained (yield: 17.3%).

EXAMPLE 117

VDC; non solvent; M+(AlEt$_3$-MEA)

2.0 millimole of the reaction product between triethyl aluminum and monoethanolamine (1:1), 1.0 millimole of vanadium oxytrichloride and 8 ml. of vinylidene chloride were introduced in that order, under cooling, into a 18 ml. pressure resistant glass reaction tube, after flushing with nitrogen gas. The tube was sealed, and then non-solvent polymerization of vinylidene chloride was carried out with stirring, at 60° C., for 3 hours. The treatment after completion of the reaction was the same as in Example 101. 4.45 gr. of white polymer was obtained (yield: 45.7%).

EXAMPLES 118–123

VDC+VC; non solvent; M+(AlEt$_3$-MEA)

2.0 millimole of the reaction product between triethyl aluminum and monoethanolamine (1:1), 1.0 millimole of vanadium oxytrichloride, a given amount of vinylidene chloride and a given amount of vinyl chloride were introduced in that order, under cooling, into a pressure resistant glass reaction tube, after flushing with nitrogen gas. The tube was sealed, and then non-solvent copolymerization of vinylidene chloride with vinyl chloride was carried out at 60° C., for 20 hours, with stirring. The treatment after completion of the reaction was the same as in Example 101. Powdery polymer was obtained. The polymer was dissolved in tetrahydrofuran, filtered and reprecipitated from distilled methanol for the purpose of purification. Thus purified polymer was used for samples for elementary analysis, infrared spectrum and nuclear magnetic resonance spectrum.

The results are shown in the following Table 16.

TABLE 16

| | Feed (ml.) | | Polymer Yield (percent) | VC Content in Copolymer (mol percent) |
|---|---|---|---|---|
| | VDC | VC* | | |
| Example No: | | | | |
| 118 | 7.0 | 1.0 | 22.5 | 17.6 |
| 119 | 6.0 | 2.0 | 22.9 | 20.9 |
| 120 | 5.0 | 3.1 | 6.4 | 37.6 |
| 121 | 4.0 | 4.2 | 7.2 | 27.2 |
| 122 | 3.0 | 5.0 | 2.0 | 53.8 |
| 123 | 2.0 | 6.0 | 5.5 | 74.4 |

*VC: Volume at −78° C.

The contents of vinyl chloride component in the copolymers were calculated from the analytical values of chlorine. The absorption band due to the deformation vibration of CH in vinyl chloride unit can be seen clearly at 1205 cm.$^{-1}$ in every infrared spectra, (measured by the KBr tablet method), of the polymers obtained in Examples 118–123. Since this absorption band is not found in polyvinylidene chloride and is supposed to appear at 1250 cm.$^{-1}$ in polyvinyl chloride, the above-mentioned result shows that the samples are not a mixture of homopolymers but copolymers. (Reference: J. Polymer Sci., A3, 3919 (1965)). Nuclear magnetic resonance spectra of the samples were measured at 160° C. from 10% chlorobenzene solutions thereof.

EXAMPLES 124–127

VDC+vinyl compound or olefin; nonsolvent; M+(AlEt$_3$-MEA)

2.0 millimole of the reaction product between triethyl aluminum and monoethanolamine (1:1), 1.0 millimole of vanadium oxytrichloride, 4.0 ml. of vinylidene chloride and 4.0 ml. of a specific comonomer were introduced in this order, under cooling, into a 18 ml. pressure resistant glass tube, after flushing with nitrogen gas. The tube was sealed, and then non-solvent copolymerizations of vinylidene chloride and several kinds of vinyl compounds were carried out at 60° C. for 20 hours with stirring. The treatments after completion of the reaction were the same as in Example 101. White powder of polymer was obtained. The polymers were extracted with acetone or tetrahydrofuran for 8 hours, or using successively the one of the above-mentioned for 8 hours and then the other for 8 hours (total: 16 hours) and reprecipitated from distilled methanol for the purpose of purification. Thus obtained polymers were used for the samples for elementary analysis and infrared spectrum.

The results are shown in the following Table 17.

TABLE 17

| Example Number | Comonomer | Polymer Yield (percent) | Solvent Extraction | | | | | |
|---|---|---|---|---|---|---|---|---|
| | | | Acetone Soluble (weight percent) | Comonomer in Acetone Soluble Fraction (mol percent) | Acetone Insoluble [c] (weight percent) | Comonomer in Acetone Insoluble Fraction (mol percent) | THF Soluble (weight percent) | Comonomer in THF Soluble Fraction (mol percent) |
| 124 | Propylene | 16.2 | [b] X | X | X | X | 90.6 | 65.0 |
| 125 | Vinyl Acetate | 54.9 | 66.2 | 21.5 | 33.8 | 15.3 | X | X |
| 126 | Me methacrylate | 100.0 | 75.2 | 50.8 | 24.8 | 27.0 | X | X |
| 127 | Me acrylate | 94.1 | 99.8 | 45.9 | 0.0 | X | X | X |

[a] Feed volume: 4.0 ml. at −78° C.
[b] X—Not extracted.
[c] The whole amounts of Acetone Insoluble Fractions of No. 125–126 were THF Soluble.

The contents of comonomer in the copolymers were calculated from the analytical values of chlorine. It was confirmed from the infrared spectra carried out by the KBr tablet method and from the solubilities in acetone or tetrahydrofuran of the polymers that the polymers were the copolymers of vinylidene chloride and a specific comonomer.

What is claimed is:

1. A method for polymerizing at least one vinyl compound expressed by a general formula of

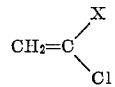

wherein X is a member selected from the group consisting of hydrogen and chlorine atom, which comprises polymerizing said vinyl compound by the use of a modified Ziegler type catalyst consisting of (a) a compound of transition metal, (b) an organoaluminum compound and (c) a lower aliphatic alcohol having, as a substituent, a member selected from the group consisting of an amino radical, nitrile radical and a halogen atom the molar ratio of said alcohol component (c) to said organoaluminum component (b) being within the range of about 0.5 to 2.

2. A method according to claim 1, wherein said compound of a transition metal is selected from the group consisting of halides, oxyhalides, alkoxides, alkoxyhalides, alkoxyacetylacetonates, acetoxyhalides and acetylacetonate of titanium, vanadium, chromium, iron, cobalt, nickel, zirconium and manganese and $TiCl_3 \cdot \frac{1}{3} AlCl_3$.

3. A method according to claim 1, wherein said organoaluminum compound is selected from the group consisting of compounds expressed by a general formula, $AlR_m X_{3-m}$, wherein R is a radical selected from alkyl, cycloalkyl and aryl radical, X is a halogen atom and $m$ is selected from 3, 2, 1.5 and 1.

4. A method according to claim 1, wherein said lower aliphatic alcohol is selected from the group consisting of alkanol amines and compounds expressed by a general formula of $HOCH_2CH_2X$ wherein X is selected from the group consisting of Cl, Br atom and CN radical.

5. A method for polymerizing at least one vinyl compound expressed by a general formula of

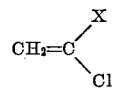

wherein X is a member selected from the group consisting of hydrogen and chlorine atom, which comprises polymerizing said vinyl compound by the use of a modified Ziegler type catalyst consisting of (a) a compound of a transition metal, (b) an organoaluminum compound and (c) a lower aliphatic alcohol having, as a substituent, a member selected from the group consisting of an amino radical, nitrile radical and a halogen atom, in the presence of a solvent the molar ratio of said alcohol component (c) to said organoaluminum component (b) being within the range of about 0.5 to 2.

6. A method according to claim 5, wherein said solvent is a halogenated hydrocarbon.

7. A method for polymerizing at least one vinyl compound expressed by a general formula of

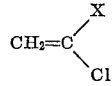

wherein X is a member selected from the group consisting of hydrogen and chlorine atom, which comprising polymerizing said vinyl compound by the use of a modified Ziegler type catalyst consisting of (a) a compound of a transition metal, (b) an organoaluminum compound and (c) a lower aliphatic alcohol having, as a constituent, a member selected from the group consisting of an amino radical, nitrile radical and a halogen atom, in the absence of a solvent the molar ratio of said alcohol component (c) to said organoaluminum component (b) being within the range of about 0.5 to 2.

8. A method for polymerizing at least one vinyl compound expressed by a general formula of

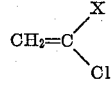

wherein X is a member selected from the group consisting of hydrogen and chlorine atom, which comprises polymerizing said vinyl compound by the use of a catalyst consisting of a compound of a transition metal and an isolated reaction product between an organoaluminum compound and an alkanolamine.

9. A method for polymerizing at least one vinyl compound expressed by a general formula of

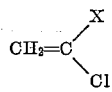

wherein X is a member selected from the group consisting of hydrogen and chlorine atom, which comprises polymerizing said vinyl compound by the use of a catalyst consisting of a compound of a transition metal and an isolated reaction product between an organoaluminum compound and an alkanolamine in the presence of a free organoaluminum compound further added the molar ratio of said alkanolamine to said organoaluminum component being within the range of about 0.5 to 2.

10. A method for copolymerizing at least one vinyl compound expressed by a general formula of

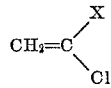

wherein X is a member selected from the group consisting of hydrogen and chlorine atom, and a polymerizable unsaturated compound, which comprises copolymerizing said compounds by the use of a modified Ziegler type catalyst consisting of (a) a compound of a transition metal, (b) an organoaluminum compound and (c) a lower aliphatic alcohol having, as a substituent, a member selected from the group consisting of an amino radical, nitrile radical and a halogen atom the molar ratio of said alcohol component (c) to said organoaluminum component (b) being within the range of about 0.5 to 2.

11. A method according to claim 10, wherein said polymerizable unsaturated compound is selected from the group consisting of vinyl acetate, styrene, alkyl vinyl ethers, alkyl acrylate, alkyl methacrylate, acrylonitrile, ethylene, propylene, butene-1,4-methylpentene-1, trichloroethylene, butadiene, maleic acid diesters and crotonic acid alkyl esters.

12. A method for copolymerizing at least one vinyl compound expressed by a general formula of

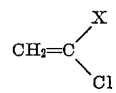

wherein X is a member selected from the group consisting of hydrogen and chlorine atom, and a polymerizable unsaturated compound, which comprises copolymerizing said compounds by the use of a catalyst consisting of a compound of a transition metal and an isolated reaction product between an organoaluminum compound and an alkanolamine the molar ratio of said alkanolamine to said organoaluminum component being within the range of about 0.5 to 2.

References Cited

UNITED STATES PATENTS

| | | | |
|---|---|---|---|
| 2,932,633 | 4/1960 | Juveland et al. | 260—94.9 |
| 3,196,137 | 7/1965 | Cain | 260—92.8 XR |
| 3,219,648 | 11/1965 | Hill | 260—94.9 XR |
| 3,251,810 | 5/1966 | Büning | 260—78.5 |

FOREIGN PATENTS 620,226    5/1961    Canada.

JOSEPH L. SCHOFER, Primary Examiner

JOHN KIGHT, Assistant Examiner

U.S. Cl. X.R.

252—429, 431; 260—33.8, 78.5, 82.1, 86.3, 87.1, 87.5, 87.7, 91.7, 92.8